Oct. 3, 1961 A. C. McCOLL 3,003,099
POSITIONING APPARATUS
Filed Sept. 12, 1960 4 Sheets-Sheet 4

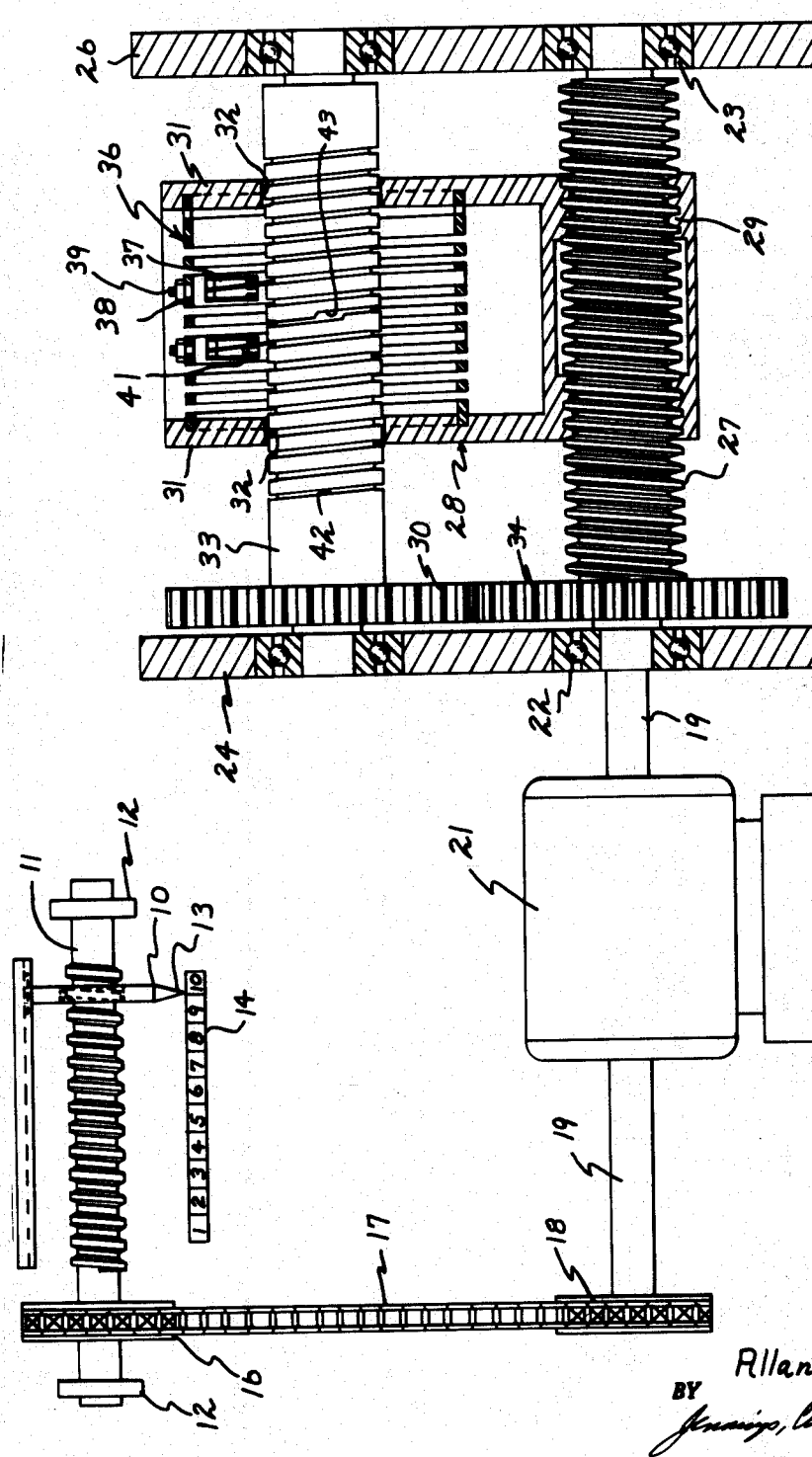

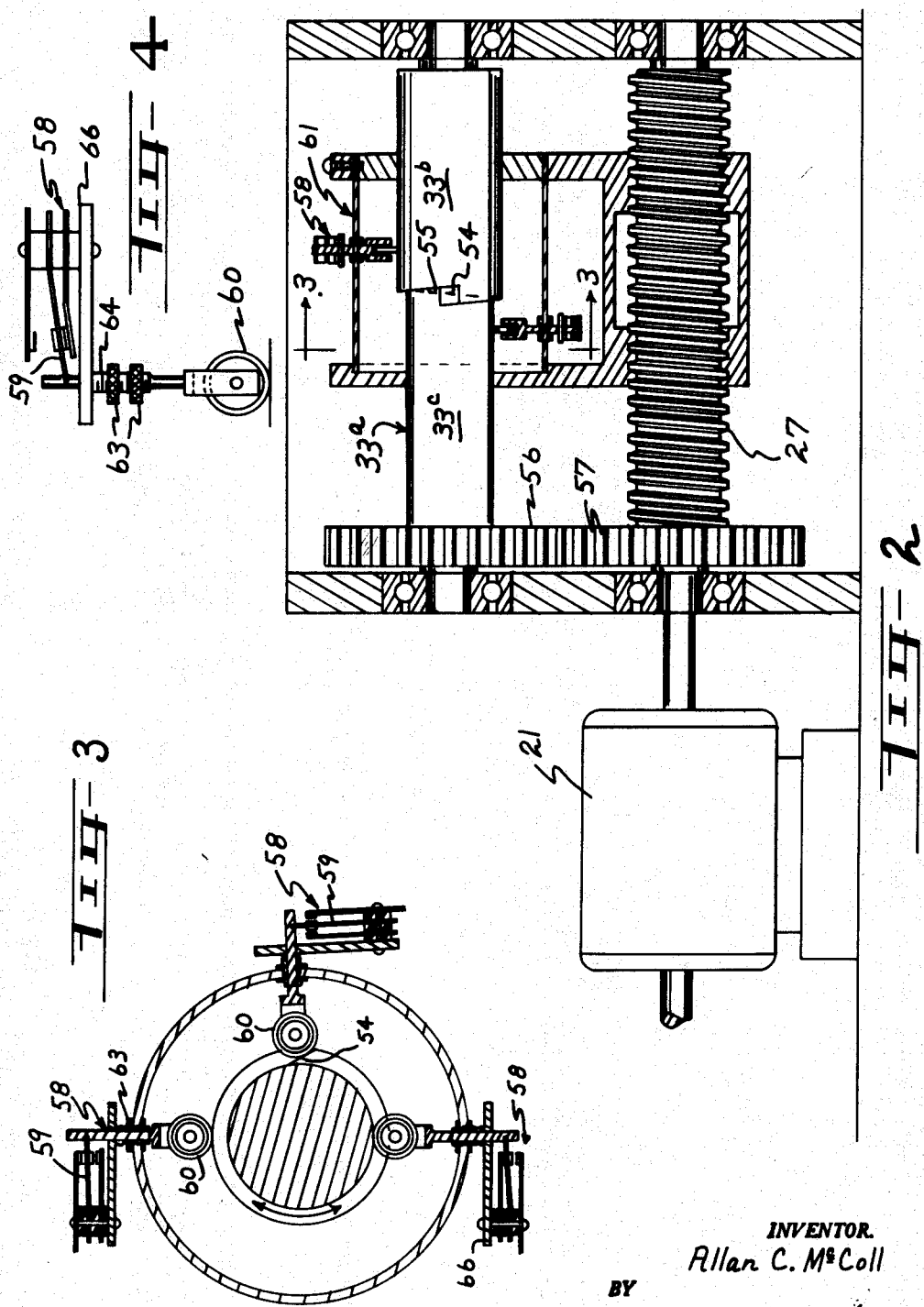

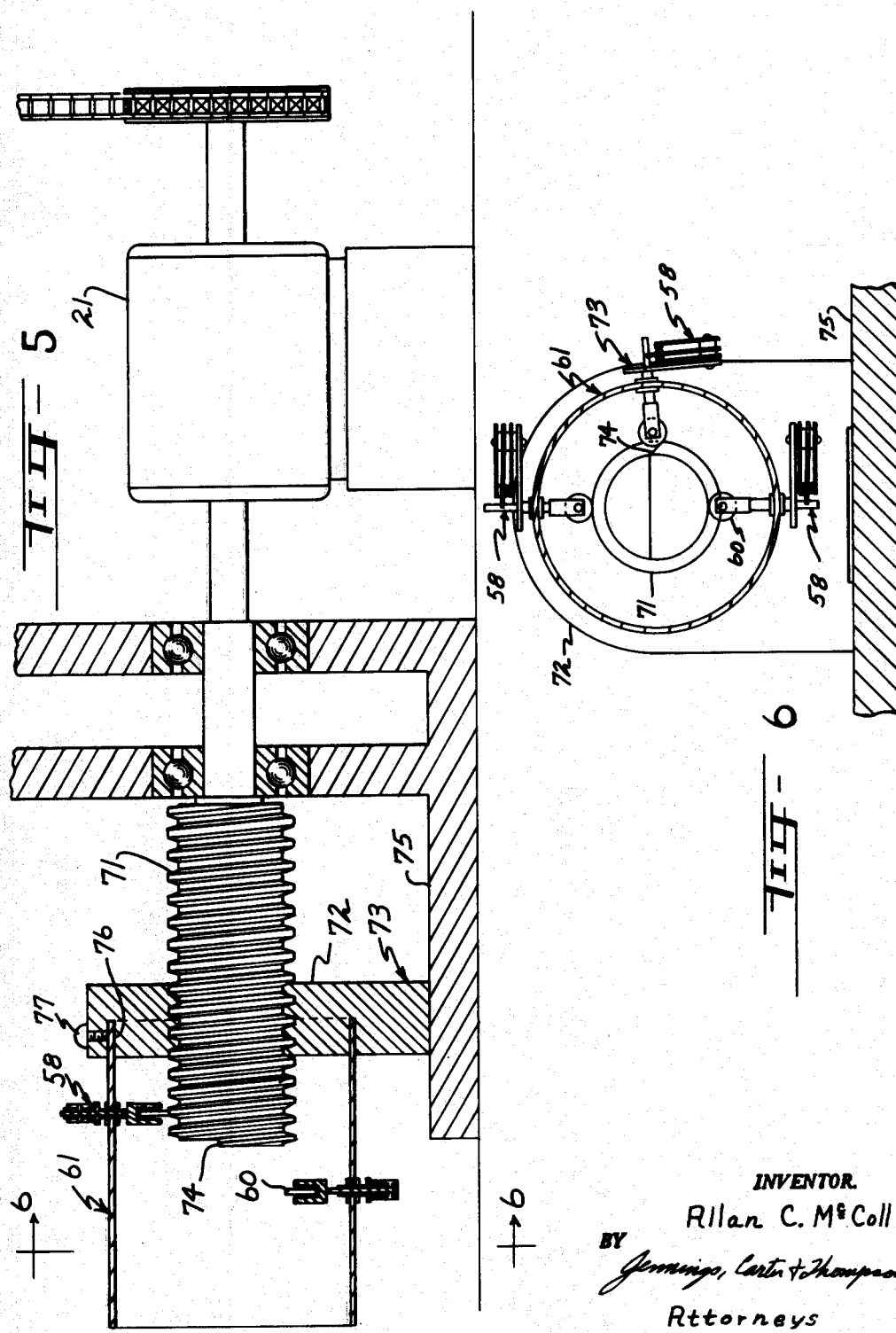

INVENTOR.
Allan C. McColl
BY
Jennings, Carter & Thompson
Attorneys

United States Patent Office 3,003,099
Patented Oct. 3, 1961

3,003,099
POSITIONING APPARATUS
Allan C. McColl, Chattanooga, Tenn., assignor to The Wheland Company, a corporation of Tennessee
Filed Sept. 12, 1960, Ser. No. 55,533
12 Claims. (Cl. 318—467)

This invention relates to positioning apparatus and more particularly to apparatus for automatically moving a member to any predetermined one of a plurality of positions, by the most direct path, both distance and time-wise, in response to the closing of an electric switch or other similar operation.

In my co-pending application, Serial No. 776,965, filed November 28, 1958, "Positioning Apparatus," I show, describe and claim apparatus for accomplishing the general purposes of the invention at hand. The apparatus of said application has been found to be a marked improvement over prior art devices for accomplishing similar purposes. More particularly, and as is pointed out in the aforesaid application, that apparatus has eliminated substantial errors which inherently are present in the settings obtained with the prior art devices.

My present invention is an improvement over the general type of apparatus shown in the above mentioned application. More specifically, the present invention has for an object the provision of apparatus which is both accurate in the sense of eliminating inherent inaccuracies and which also permits a greater degree of accuracy in positioning the member by providing means to determine more accurately, to an almost indefinite degree, where the member to be positioned will be stopped in response to the rotation of a shaft.

Another object of the present invention is to simplify and make more economical the production of apparatus for positioning devices.

Another object of my invention is to provide a device of the character designated in which the error of the setting of the member to be positioned is not dependent upon the number of possible positions, nor upon the errors which may be inherent in the relative rotations of two shafts, but on the other hand to provide apparatus in which the sole error of the exact position of the member to be positioned is that negligible error in the mechanical, positive drive connections of the parts themselves.

Briefly, my invention comprises a shaft which preferably is mounted for rotation. Alongside the shaft, preferably surrounding the same, is mounted a holder for a plurality of switches, hydraulic or air valves, or the like. The holder is moved longitudinal of the shaft precisely in accordance with the number of rotations or partial rotations of the shaft. This preferably is accomplished by mounting the holder on a nut threaded on the shaft or, by having a second shaft, identically threaded with the shaft against which the switches are to bear and driving them in unison. The switches have operating arms which are mounted on a spiral path around the shaft in such manner that they may be shifted around the shaft, thus to adjust them with great accuracy to any desired position axially of the shaft. Means are provided whereby the switch which selects the position of the member to be located is open when it is at a given place axially of the shaft. By employing double contact switches with neutral position and by using a reversible prime mover for rotating the shaft, I am enabled to cause the shaft to rotate in a direction to move the member to be positioned by the most direct route to the selected position. In practice, I may make the holder in the form of a spirally arranged member surrounding the controller shaft. As another modification I may provide the controller shaft with two sections of different diameter. As a third and still more simple modification I may provide a shaft in which the position thereon to open the switch is at the end of the shaft, that is, a position wherein the "open" switch is just in contact with the end of a thread or similar configuration adjacent the end of the shaft.

Apparatus illustrating features of my invention is shown in the accompanying drawing forming a part of this application in which:

FIG. 1 is a vertical sectional view showing my improved apparatus and showing in diagrammatic manner a member to be positioned;

FIG. 2 is a view of a modified form and corresponding generally to FIG. 1 but omitting the member to be positioned;

FIG. 3 is an enlarged detail sectional view taken generally along line 3—3 of FIG. 2;

FIG. 4 is a still further enlarged detail view of one of the switches and its operator removed from the remaining portions of the device;

FIG. 5 is a vertical sectional view of a still further modified form of my invention;

FIG. 6 is a detail sectional view taken generally along line 6—6 of FIG. 5;

Figure 7:
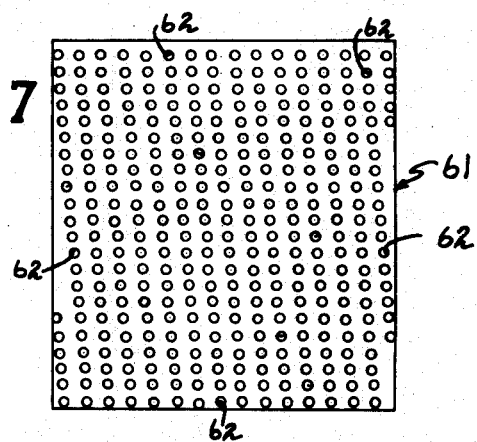
FIG. 7 is a developed view of the holder for the switches shown in FIGS. 2 and 3 and illustrating the arrangement of the spiral path for mounting the switches.

Referring now to the drawings for a better understanding of my invention and more particularly to FIG. 1, I illustrate in diagrammatic manner a member to be positioned as being a non-rotatable nut 10 mounted on a shaft 11. The shaft is threaded as illustrated and may be supported in bearings 12. The nut 10 may have a pointer 13 which moves alongside a scale indicated at 14 and which illustrates the position of the nut. As has been said, the object is to cause the nut to move to any one of the selected positions, these being illustrated as positions 1 to 10 on the scale 14. The object further is to cause a nut to move by the most direct route from whatever position it then occupies to the desired or selected position.

The shaft may carry a sprocket 16 over which passes a sprocket chain 17. The chain passes over a sprocket 18 fast on a shaft 19 of a reversible electric motor 21. The shaft 19 may pass through bearings 22 and 23 mounted in vertical side members 24 and 26. The shaft also is threaded as at 27.

On shaft 27 is a switch holder illustrated generally by the numeral 28. The holder 28 has a nut section 29, threaded on the shaft 27, and an upper section in the form of side walls 31. The upper section is provided with openings 32 which pass slidably over a second grooved or threaded shaft 33. The shaft 33 is also mounted in suitable bearings as illustrated in the side members 24 and 26, and is positively driven from shaft 19 by means of the gears 30 and 34 and hence is driven in timed relation to shaft 27.

Mounted in the holder 28 is a spirally grooved member 36 having a pitch corresponding exactly with the pitch of the threads on shaft 27, but wound to the opposite hand. Adapted for mounting on the spirally wound member 36 are a plurality of switches 37. The switches may be held in adjusted angular position on the holder by means of nuts 38 on screws 39 passing through adjacent flights of the holder 36. The switches 37 have contact arms 41 which are disposed to fit in a thread-like, spiral groove 42 formed in the surface of the shaft 33. The pitch of this grooves is identical with the pitch of the threads on shaft 27. The spirally wound holder 36 and the groove 42 are pitched in the same direction.

It will be noted that at one position on the shaft 33 the groove 42 is widened between two of its adjacent convolutions to provide a small space 43. As will later appear, whenever the contact arms 41 of any of the switches 37 occupy the position 43, the switches are so constructed that neither of their sets of contacts are closed, that is, such switch is open.

Figure 8:
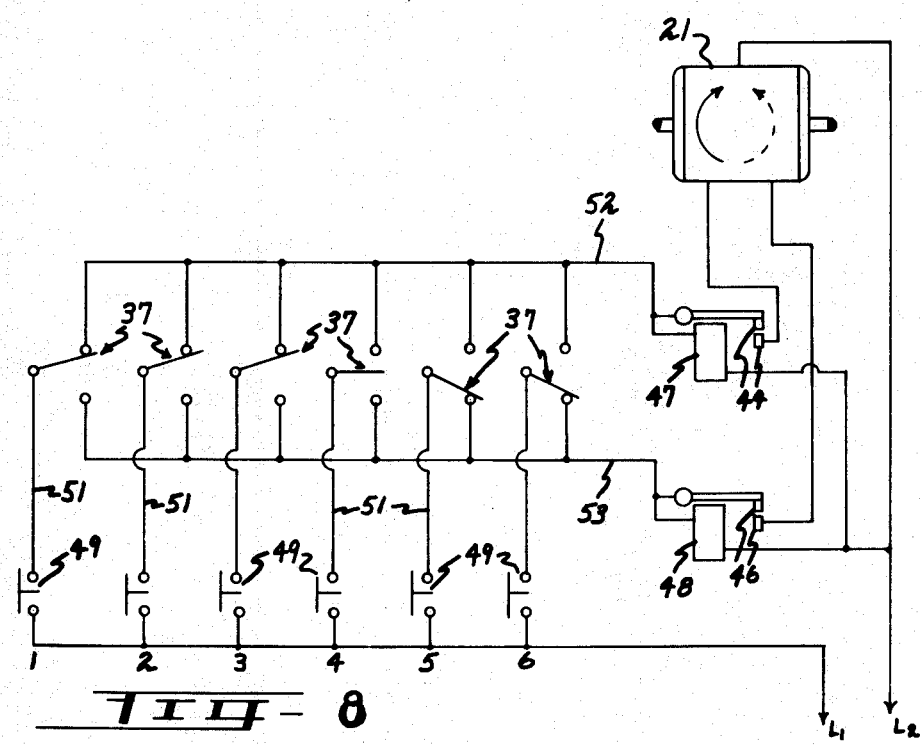
FIG. 8 is a wiring diagram.

Referring now to FIG. 8 of the drawing it will be seen that the motor 21, which is preferably an electric motor and which is reversible, is energized by the closing of contacts 44 to run in one direction and is energized by the closing of contacts 46 to run in the opposite direction. In order to close the proper set of contacts I provide a relay coil 47 controlling the contacts 44 and a relay coil 48 controlling the contacts 46.

It will further be noticed from FIG. 8 that each of the switches 37 is connected by a normally open push-button switch 49 corresponding to the several positions 1 to 10 indicated on the scale 14. Each switch is connected by a line 51 to the movable contact arm of each of the switches 37. One set of the contacts are all connected by a line 52 to one side of coil 47. The other contacts of switches 37 are connected by the line 53 to one side of coil 48. The coils are connected to line $L_2$ as shown, whereas the other contacts of the switches 49 are connected to line $L_1$. It will further be noted from FIG. 8 that only the switch whose contact arm 41 occupies the open space 43 is open. Those to the left of the space 43 as viewed in FIGS. 1 and 8 have their "upper" contacts closed, whereas those to the right of the space 43 have their "lower" contacts closed. This is brought about merely by loosening the nuts 38 and shifting the switches spirally around the shaft 33.

In operation, and from an inspection of FIG. 8, it will be seen that the switch occupying the position numbered 4 is open. Let it now be assumed that the manually operated switch 49 corresponding to position 2 is closed. This establishes a circuit from $L_1$, line 51, "upper" contact of associated switch 37, line 52, to coil 47 controlling contacts 44, thence to $L_2$. This causes the motor 21 to run in one direction, for instance, in the direction illustrated by the solid arrow. As long as the switch 49 of the number 2 position is held closed, coil 47 is energized and the motor continues to run, driving the shaft 27 and hence moving the switch holder axially along shaft 33. The motor 21 remains energized until such time as the switch arm 41 of switch 37 in circuit with switch 49 of the number 2 position comes into the widened space 43. Since the switches 37 are biased to open position, immediately upon the switch arm of the switch then in circuit arriving at the space 43, the switch 37 opens, deenergizing the motor. It will thus be seen that all of the switches 37 to the right of the switch having its contact at position 43 have their contacts closed so as to ready the energization of coil 48. Those to the left of the switch occupying the position at 43 have their contacts closed so as to ready the energization of coil 47.

It will further be noted that simply by loosening the nuts 38 of each switch I am enabled to obtain almost micrometer adjustment of the deenergization point for the motor 21. Therefore, the nut 10 is extremely accuratey positioned.

Referring now to FIGS. 2, 3 and 4 I illustrate a modification of my invention. In this case instead of grooving the shaft 33 I provide a shaft 33ª which has a large diameter section 33ᵇ and a reduced diameter section 33ᶜ. The sections are connected by a spirally pitched shoulder 55 which terminates in a flat, wedge-like section 54. The shaft 33ª is driven by the gears 56 and 57 in timed relation with shaft 27.

In the modification being described the switches 58 are so designed that the switch arms 59 thereof are biased to close one set of the contacts whenever their small contacting elements in the form of the rollers 60 are not in contact with section 33ᵇ of shaft 33ª, or are not on the position 54. However, when any one of the rollers 60 is on position 54, both of the contacts of the switches 58 are open as clearly shown in FIG. 3. Similarly, whenever the rollers are on the large diameter portion 33ᵇ of shaft 33ª, the opposite sets of contacts of each of the switches 58 are closed.

The switches are mounted on a holder 61 which may be in the form of a cylinder and which, as shown in FIG. 7 in developed form, may have a series of openings 62 therein. The openings are laid out on a spiral path corresponding precisely to the pitch of the threads of shaft 27 and also corresponding to the pitch forming the shoulder 55. The switches may be secured selectively in the holes 62 by means of nuts 63 which are threaded onto a tubular, downwardly extending guide 64 formed as a part of the base 66 of the switches 58. Therefore, simply by selecting the proper hole for the switches I can accurately determine the deenergization point of the motor 21 whenever any one of the switches is opened by having its actuating member occupy the position 54. It will further be apparent that the wiring diagram of FIG. 8 may be employed with the modification just described.

Referring now to FIGS. 5 and 6 of the drawings I show a still further form of my invention which is even more simple than the ones previously described. In this case the motor 21 drives a shaft 71 which is threaded. Threaded onto the shaft 71 is the nut section 72 of a switch holder support indicated generally by the numeral 73. The switch holder support slides on a base support member 75, as the shaft 71 is revolved. The switch holder proper 61 may be identical in construction with the switch holder shown in FIG. 2 and which has the series of holes laid out in a spiral path. Further, the switches employed with the modification under description may be identical with the switches 58 in which, when the rollers 60 of any of the switches are out of contact with the shaft, one set of contacts is closed.

It will be seen that the switches 58 in the modification of FIGS. 5 and 6 are mounted so that the rollers 60 thereof run upon the tops of the threads of the shaft 71. Thus, as shaft 71 rotates the entire holder is moved longitudinally of the shaft, the rollers remaining precisely on tops of the threads until the holder advances to the point where the rollers run off the threads. At the end of the shaft I provide an eased section of the thread of the shaft illustrated at 74. As is shown in FIG. 6, whenever any roller 60 of any of the switches occupies the position resting on the eased section 74 of the thread, the switch is open. Similarly, all switches out of contact with the shaft have one set of their contacts closed; all switches having their rollers in full contact with the tops of the threads have their opposite sets of contacts closed.

In addition to obtaining micrometer adjustment for the stopping point of the motor 21 by selecting the holes 62 for the switches, I mount the holder 61 of the modification of FIGS. 5 and 6 so that the entire holder may be rotated relative to the nut. That is to say, I groove the face of the nut with an annular groove 76 so that the cylindrical holder 61 fits therein. By loosening a set screw 77 the entire holder, carrying all the switches, may be rotated relative to shafts 71 thus to obtain extremely accurate positioning for the switches.

The modification of FIGS. 5 and 6 may be employed with the wiring diagram of FIG. 8 and operates as has already been described in connection with FIG. 1.

From the foregoing it will be apparent that I have devised an extremely accurate, inexpensive and reliable apparatus for positioning devices. While in this disclosure and in the appended claims I show and claim "switches" it will be apparent that there could be substituted for the "switches" any number of different types of control devices. For instance, it will be apparent that one might have the rollers or similar devices corresponding to rollers 60 operate hydraulic or air valves, to operate directly a series of relays instead of "switches" and other modifications and variations. Therefore, in the appended claims the expression "switches" is intended to include all such devices in which by their operation upon arriving at a given point along the several shafts cause the deenergization of a motor.

While I have shown my invention in several forms, it will be obvious to those skilled in the art that it is not so limited but is susceptible of various other changes and modifications without departing from the spirit thereof, and I desire, therefore, that only such limitations shall be placed thereupon as are specifically set forth in the appended claims.

What I claim is:

1. In positioning apparatus, a shaft, means to rotate the shaft, a switch holder mounted for movement axially of the shaft, a plurality of switches supported by the holder and having elements disposed to contact the shaft, means to shift the holder axially of the shaft in direct relationship to the rotation of the shaft, means on the shaft effective upon arrival thereat of the element on one of said switches in contact with the shaft to actuate the said one switch, and means responsive to the actuation of said one switch to deenergize the means rotating the shaft, thereby to stop the shaft in the position determined by the switch which is actuated as aforesaid.

2. In positioning apparatus, a shaft, power means which when energized rotates the shaft in selected direction, a switch holder at least partially surrounding the shaft, a plurality of double contact neutral position switches mounted on the holder, said switches having actuating members engageable with the shaft to operate the switches, means to shift the holder axially of the shaft in equal increments of movement in response to predetermined rotation of the shaft, means effective upon arrival of one of said actuating members at a predetermined position on the shaft to actuate its associated switch thereby to open said switch and deenergize the power means, the actuators for the remaining switches being relatively positioned when not in said predetermined position for all of them disposed axially from one side of the said position to close one of the contacts of their switches and for those on the opposite side thereof to close the other contacts of their respective switches, and circuits including said switches thereby providing a circuit path to said power means through which it may be caused to operate in selected direction depending upon which of said closed switches is included in the circuit path.

3. In a control for positioning apparatus, a shaft, a switch holder extending alongside the shaft, means to move the holder axially of the shaft upon rotation of the latter, at least two double-throw with neutral position switches on the holder having actuating elements disposed to contact the shaft and effective when in one axial position relative to the shaft for the switch occupying said position to be open, reversible power means for rotating the shaft and hence to move the holder in either direction relative to the shaft, means to include the switch not occupying said position in circuit with the power means to drive it in one direction, and means to include the switch occupying said position in circuit with the power means to operate it in the opposite direction when the last mentioned switch moves away from said position.

4. In apparatus for energizing a reversible prime mover and hold it energized until it has rotated in a selected direction for a predetermined number of revolutions, a shaft positively driven from the prime mover, a switch holder mounted for movement axially of the shaft, means to move the holder axially of the shaft in proportion to the number of revolutions of the shaft and in either direction depending upon the direction of rotation of the shaft, at least two double contact neutral position switches on the holder spaced longitudinally thereof from each other, the sets of contacts of each switch being selectively and nonconcomitantly includable in circuit with the prime mover to cause it to rotate in either direction, a position on the shaft which when occupied by either of said switches causes the switch to open, and means to close one set of contacts on the other of said switches not occupying said position, whereby upon including any one of the other switches in circuit with the prime mover it moves in the direction determined by the set of contacts which is closed.

5. In control apparatus, a threaded shaft, means to rotate the shaft in either direction, a second shaft driven in timed relation with the threaded shaft, a holder for a plurality of electric switches threaded on the first shaft and having a part movable alongside and axially of the second shaft as the threaded shaft rotates, a plurality of electric switches on the holder arranged thereon for one only of the same to be open at a time when the holder is in a given longitudinal position relative to the second shaft, and means cooperating between the second shaft and said switches effective to close all of the same except said one switch in position to ready the drive means for operation in predetermined directions.

6. Apparatus as defined in claim 5 in which the means to close all said switches except said one switch includes means to position all said switches on one side opposite said one switch to ready the drive means for "forward" operation and those on the opposite side to ready it for "reverse" operation.

7. Apparatus as defined in claim 5 in which said holder embodies means to support said switches about the second named shaft on a spiral path corresponding in pitch to the pitch of the threads of the threaded shaft.

8. In control apparatus, a shaft, a reversible motor connected in positive driving relation to the shaft, a holder for a plurality of switches surrounding the shaft and movable axially thereof in timed relation to the rotation of the shaft and in a direction dependent upon the direction of rotation of the shaft, a plurality of double throw neutral position switches mounted about the holder, each switch having an operating element in contact with the shaft, means on the shaft effective upon arrival thereat of either switch operating element to permit said switch to open, said switches being so arranged relative to the shaft that one set of contacts of the switches axially displaced on one side of the open switch are closed, whereas those switches on the opposite side of the closed switch have their other sets of contacts closed, and a plurality of other switches and circuits in which are included the first named switches and the reversible prime mover, whereby upon closing any one of the said other switches the prime mover is energized in a direction to move the first named switch then included in circuit with the prime mover toward said position on the shaft.

9. In apparatus of the character described, a rotatable threaded shaft, a reversible prime mover for positively driving the shaft, a member to be positioned positively driven by the prime mover and movable from one position to another in response to energization of the prime mover, switches corresponding to each position of the member and having operating members in contact with the threaded shaft, a cylindrical switch holder surrounding the shaft on which the switches are mounted along a spiral path corresponding in pitch to the pitch of the threads of the shaft, each of said switches having separate contacts includable in circuit with the prime mover to energize it for rotation selectively in either direction, a nut on the shaft operatively connected to the holder and effective upon rotation of the shaft to move the holder axially of the shaft, means on the shaft effective upon arrival thereat of the operating members of said switches to permit said switches to open, thereby to deenergize the prime mover, and circuits and other switches for establishing a circuit through any one of the other switches to said prime mover, whereby the prime mover is energized in a direction to move the switch so included toward switch opening position.

10. In control apparatus, a threaded shaft, a reversible motor connected in driving relation to the shaft, a holder for a plurality of switches having a nut section threaded on the shaft whereby the holder moves axially of the shaft upon rotation thereof, a plurality of double contact with neutral position switches mounted in axially spaced position on the holder, each switch having means biasing one set of contacts closed and having an operating element disposed to contact the tops of the threads on the shaft, thereby to hold closed the other sets of contacts of the switches, a position on said shaft effective upon arrival thereat of either of said switches to open the contacts thereof, all of the switches on the side of said position opposite the side on which the switch operating elements are in contact with the threads being out of contact therewith, thereby permitting said biasing means to close the other set of contacts of said switches, and circuits and other switches for establishing circuit paths to the motor through selected ones of said switches on the holder, whereby the motor may be caused to run in a selected direction until such time as the switch then in circuit with said motor reaches said position on the shaft.

11. Apparatus as defined in claim 10 in which the operating elements for the switches are mounted on the holder in a spiral path corresponding to the pitch of the threads on the threaded shaft.

12. Apparatus as defined in claim 10 in which the holder is adjustably mounted for axial rotation relative to the shaft, whereby the angular position of the switch operating elements relative to the shaft may be varied.

No references cited.